(12) United States Patent
Yang

(10) Patent No.: US 9,066,378 B2
(45) Date of Patent: Jun. 23, 2015

(54) LIGHTING DEVICE WITH OPTICAL PULSATION SUPPRESSION BY POLYPHASE-DRIVEN ELECTRIC ENERGY

(76) Inventor: Tai-Her Yang, Dzan-Hwa (TW)

( * ) Notice: Subject to any disclaimer, the term of this patent is extended or adjusted under 35 U.S.C. 154(b) by 825 days.

(21) Appl. No.: 13/226,632

(22) Filed: Sep. 7, 2011

(65) Prior Publication Data

US 2012/0062124 A1 Mar. 15, 2012

Related U.S. Application Data

(63) Continuation-in-part of application No. 12/457,998, filed on Jun. 29, 2009, now Pat. No. 8,664,876.

(51) Int. Cl.
*H05B 37/02* (2006.01)
*H05B 33/08* (2006.01)
*H05B 39/00* (2006.01)
*H05B 41/16* (2006.01)

(52) U.S. Cl.
CPC ............ *H05B 37/02* (2013.01); *H05B 33/0809* (2013.01); *H05B 39/00* (2013.01); *H05B 41/16* (2013.01); *Y02B 20/342* (2013.01)

(58) Field of Classification Search
CPC .... H05B 33/08; H05B 33/0809; H05B 37/02; H05B 39/00; H05B 41/16; Y02B 20/342
USPC ......... 315/137–148, 228, 250, 258, 291, 294, 315/200 R
See application file for complete search history.

(56) References Cited

U.S. PATENT DOCUMENTS

| | | | | |
|---|---|---|---|---|
| 2,265,323 A | * | 12/1941 | Spanner | 315/266 |
| 2,354,654 A | * | 8/1944 | Abbott | 315/138 |
| 4,084,217 A | * | 4/1978 | Brandli et al. | 363/4 |
| 4,369,490 A | * | 1/1983 | Blum | 363/48 |
| 8,049,709 B2 | * | 11/2011 | Roberts et al. | 345/102 |
| 2005/0269964 A1 | * | 12/2005 | Ravindra et al. | 315/209 R |
| 2007/0090767 A1 | * | 4/2007 | Roberts | 315/139 |

* cited by examiner

*Primary Examiner* — Jimmy Vu
(74) *Attorney, Agent, or Firm* — Bacon & Thomas, PLLC

(57) ABSTRACT

Polyphase alternating current power or direct current power rectified from polyphase alternating current power is used to drive a commonly-driven luminous body, or to separately drive adjacently installed individual electric-driven luminous bodies, so as to reduce pulsation of the light output.

8 Claims, 9 Drawing Sheets

US 9,066,378 B2

LIGHTING DEVICE WITH OPTICAL PULSATION SUPPRESSION BY POLYPHASE-DRIVEN ELECTRIC ENERGY

CROSS-REFERENCE TO RELATED APPLICATION

This application is a Continuation-In-Part of my patent application Ser. No. 12/457,998, filed on Jun. 29, 2009.

BACKGROUND OF THE INVENTION (a) Field of the Invention

The present invention relates to a method of using polyphase-driven electric energy to reduce a pulsation rate or changes in brightness resulting from the supply of alternating current power to an electric-driven luminous body.

(b) Description of the Prior Art

The deficiency of traditional alternating current lamps lies in their discontinuous optical pulsation caused by the alternating current power pulsation.

SUMMARY OF THE INVENTION

The present invention relies on polyphase alternating current power or direct current power rectified from polyphase alternating current power to drive a common electric-driven luminous body, or to separately drive adjacently individually-installed electric-driven luminous bodies so that alternating-current-induced pulsation of the light output of the luminous body or bodies is reduced.

BRIEF DESCRIPTION OF THE DRAWINGS

as shown in FIG. 9.

as shown in FIG. 10.

as shown in FIG. 11.

DESCRIPTION OF MAIN COMPONENT SYMBOLS (101)ˋ (102)ˋ (103): Electric-driven luminous body
(1000): Inductive impedance component
(1011)ˋ (1012)ˋ (1021)ˋ (1022)ˋ (1031)ˋ (1032)ˋ (2011)ˋ (2012)ˋ (3011)ˋ (3012): Conductive terminals
(2000): Direct current electric-driven luminous body
(201): Capacitor
(3000): Three-phase bridge rectifier
(301): Inductor
(3500): Three-phase half wave rectifier
(401): Resistor
(703)ˋ (704): Rectifier diodes
(802)ˋ (803)ˋ (804): Single phase bridge rectifiers
a: Alternating Current power waveform
b: Waveform of direct current rectified from alternating current
c: Optical pulsation waveform of electric-driven luminous body
(I101)ˋ (I102)ˋ (I103): Current
N: Neutral line
Rˋ Sˋ T: Three-phase alternating current power lines
(Z10): Current limiting component
(Z11): Half wave current limiting impedance component

DETAILED DESCRIPTION OF THE PREFERRED EMBODIMENTS

The deficiency of traditional alternating current lamps lies in their discontinuous pulsating light output caused by alternating current power pulsation.

The present invention relies on polyphase alternating current power or direct current power rectified from polyphase alternating current power to drive a common-electric-driven luminous body, or to separately drive adjacently installed individual electric-driven luminous bodies, so that pulsation of the light output by the luminous body or bodies is reduced.

Figure 1:
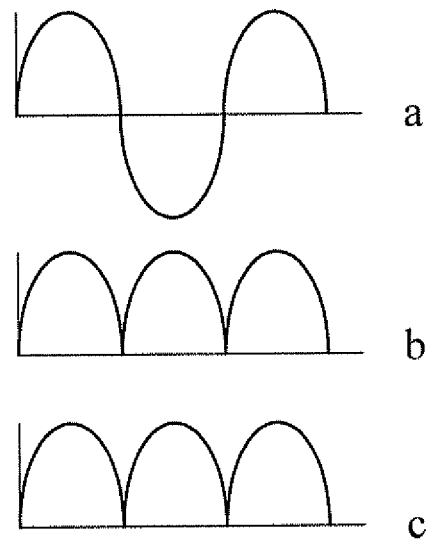
FIG. 1 is are waveform diagrams of a traditional single phase alternating current power or alternating current full wave-rectified direct current directly driving the electric-driven luminous body.

FIG. 1 is a waveform diagram of the optical pulsation resulting from the traditional use of single phase alternating current power or alternating current full wave-rectified direct current to directly drive the electric-driven luminous body.

As shown in FIG. 1, a is an alternating current power waveform, b is a waveform of a direct current rectified from alternating current, and c is an optical pulsation waveform of the electric-driven luminous body. If the electric energy input is a bidirectional pulsating electric energy with a bidirectional non-sinusoidal wave, the result is also the same.

Figure 2:
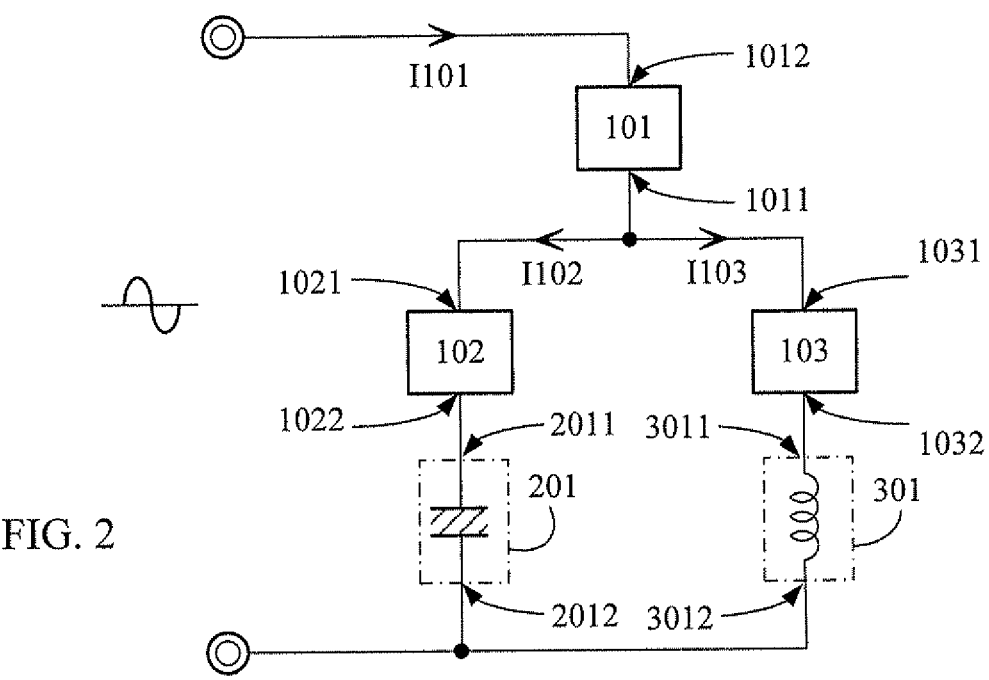
FIG. 2 is a circuit diagram of an electric-driven luminous body individually driven by single phase power in three ways through an inductor split-phase current, a capacitor split-phase current and a resultant vector current of the inductor and capacitor split-phase currents.

FIG. 2 is a circuit diagram of an electric-driven luminous body individually driven by single phase power in three ways through inductor split-phase current, capacitor split-phase current or the resultant vector current of the inductor and capacitor split-phase currents.

As shown in FIG. 2, the components of a preferred circuit are arranged as follows:

The terminals (1011), (1021), and (1031) of the electric-driven luminous bodies (101), (102) and (103) driven by bidirectional electric energy are connected together, the other terminal (1022) of the electric-driven luminous body (102) is arranged to connect with one terminal (2011) of the capacitor (201), the other terminal (1032) of the electric-driven luminous body (103) is arranged to connect with one terminal (3011) of the inductor (301), another terminal (2012) of the capacitor (201) and another terminal (3012) of the inductor (301) are connected to one terminal of an alternating current or bidirectional electric energy, and the other terminal (1012) of the electric-driven luminous body (101) is arranged to connect with the other terminal of the alternating current or bidirectional electric energy, wherein the current (I101) that passes through the electric-driven luminous body (101) is the vector sum of the current (I102) that passes through the electric-driven luminous body (102) and the current (I103) of the electric-driven luminous body (103), i.e., the total current.

Electric-driven luminous bodies (101), (102), (103) may be gas bulbs with filaments or solid state electric-driven luminous bodies such as LEDs and other electric-driven luminous bodies, and the three luminous bodies may be integrated into one body or adjacently installed.

Figure 3:
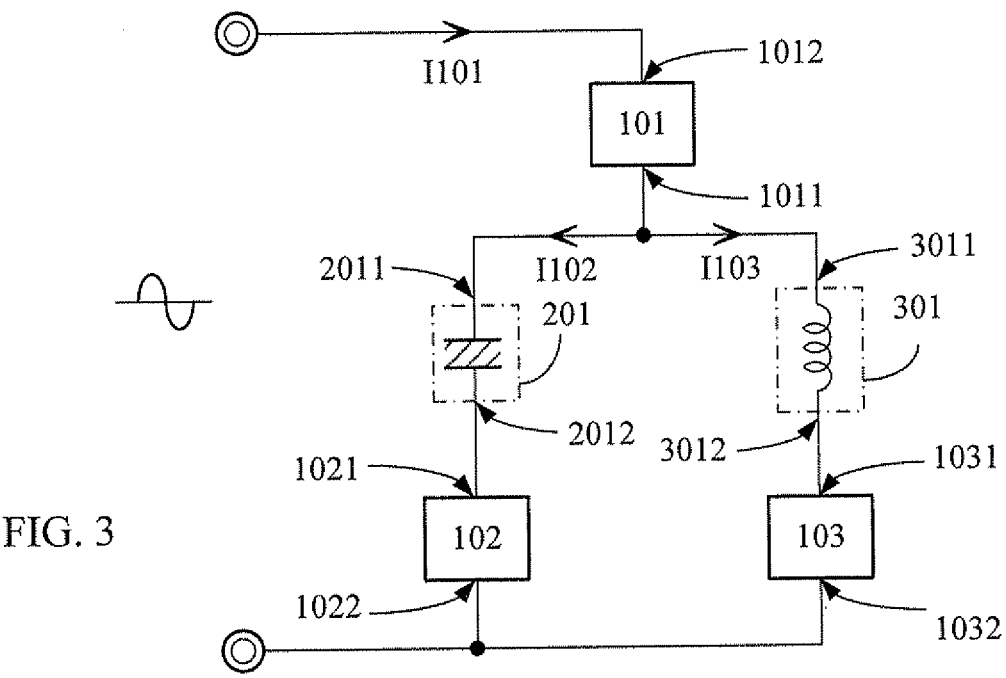
FIG. 3 is a circuit diagram of the circuit shown in FIG. 2 in which the positions of the capacitor (201) and the electric-driven luminous body (102) and/or the inductor (301) and the electric-driven luminous body (103) are interchanged.

FIG. 3 is a circuit diagram of the circuit shown in FIG. 2 in which the positions of the capacitor (201) and the electric-driven luminous body (102) and/or the inductor (301) and the electric-driven luminous body (103) are interchanged; wherein The terminal (1011) of the electric-driven luminous body (101), the terminal (2011) of the capacitor (201) and the terminal (3011) of the inductor (301) are connected together, the other terminal (2012) of the capacitor (201) is connected to the terminal (1021) of the electric-driven luminous body (102), the other terminal (3012) of the inductor (301) is connected to one terminal (1031) of the electric-driven luminous body (103), the other terminal (1022) of the electric-driven luminous body (102) and the terminal (1032) of the electric-driven luminous body (103) are connected to a terminal of a power source, and the other terminal (1012) of the electric-driven luminous body (101) is connected to the other terminal of the power source.

Electric-driven luminous bodies (101), (102), (103) may include gas bulbs with filaments or solid state electric-driven luminous bodies such as LEDs and other electric-driven luminous bodies, and the three luminous bodies may be integrated into one body or the three bodies may be adjacently installed.

Moreover, if the electric-driven luminous body series connected with one of the capacitor (201) or inductor (301) is directly connected in parallel with the electric-driven luminous body (101) or the electric-driven luminous body (101) that is series connected with the resistor, then the pulsation of the output light energy is also reduced.

Figure 4:
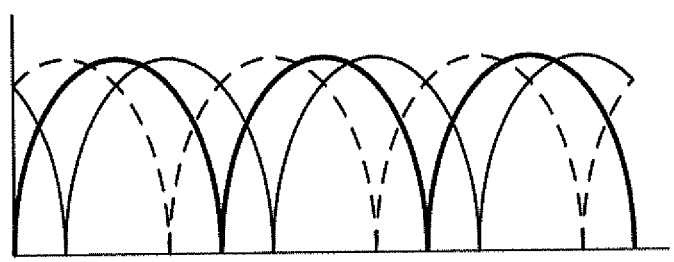
FIG. 4 is a diagram showing brightness variations of the electric-driven luminous bodies in FIG. 2 and FIG. 3.

FIG. 4 is a waveform diagram for the electric-driven luminous bodies in FIG. 2 and FIG. 3, again showing that the luminous pulsation is significantly reduced.

Figure 5:
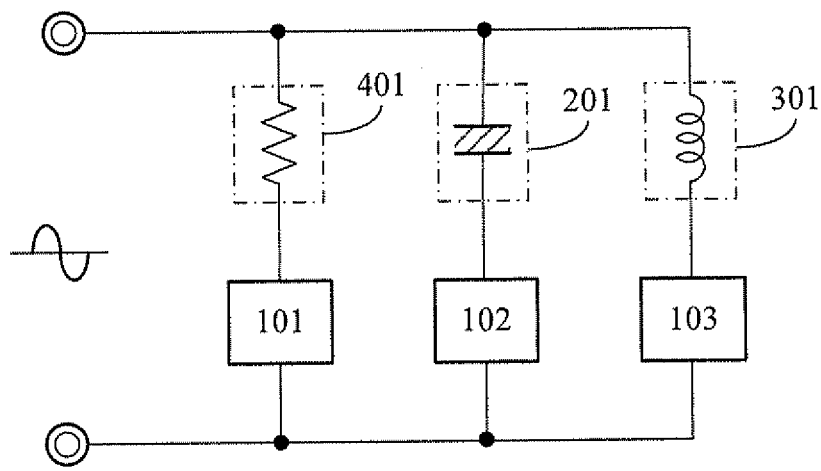
FIG. 5 is a circuit block diagram of the present invention in which the alternating current power is connected in parallel with the capacitor (201), which is in series with the electric-driven luminous body (102), the inductor (301) which is in series with the electric-driven luminous body (103), and directly with the electric-driven luminous body (101) or the electric-driven luminous body (101) series connected with the resistor (401).

FIG. 5 is a circuit block diagram of the present invention in which the alternating current power is connected in parallel with the capacitor (201) in series with the electric-driven luminous body (102), the inductor (301) in series with the electric-driven luminous body (103), and directly with the electric-driven luminous body (101) or the electric-driven luminous body (101) series connected with the resistor (401).

As shown in FIG. 5, the capacitor (201) which is series connected with the electric-driven luminous body (102), the inductor (301) which is series connected with the electric-driven luminous body (103), and the electric-driven luminous body (101) directly or the electric-driven luminous body (101) series connected with the resistor (401) are arranged to parallel connect with the alternating current power source.

Figure 6:
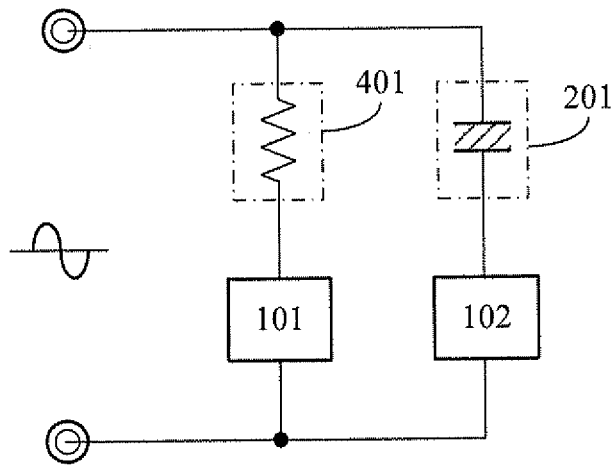
FIG. 6 is a circuit block diagram of the present invention showing the capacitor (201) in series with the electric-driven luminous body (102), which is parallel connected directly with the electric-driven luminous body (101) or with the electric-driven luminous body (101) in series with the resistor (401), so as to be driven by the alternating current or bidirectional power.

FIG. 6 is circuit block diagram of the present invention showing the capacitor (201) in series with the electric-driven luminous body (102) and parallel connected directly with the electric-driven luminous body (101) or with the electric-driven luminous body (101) in series with the resistor (401), so as to be driven by the alternating current or bidirectional power. As shown in FIG. 6, the capacitor (201) series connects with the electric-driven luminous body (102), and connects in parallel directly with the electric-driven luminous body (101) or with the electric-driven luminous body (101) in series with the resistor (401), so as to be driven by the alternating current or bidirectional power.

Figure 7:
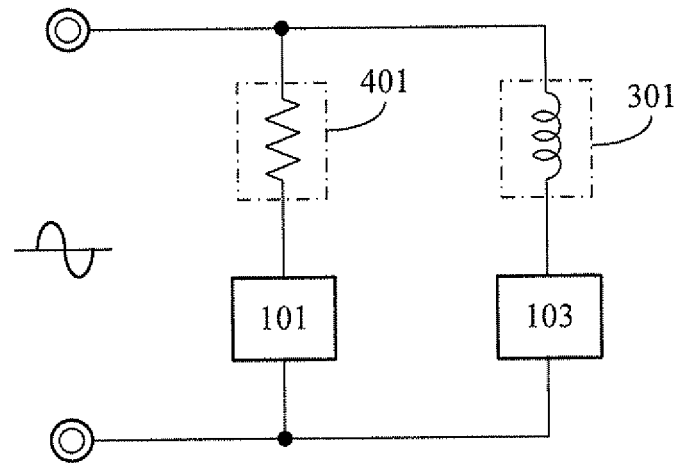
FIG. 7 is a circuit block diagram of the present invention showing the inductor (301) in series with the electric-driven luminous body (103), which is parallel connected directly with the electric-driven luminous body (101) or with the electric-driven luminous body (101) in series with the resistor (401), so as to be driven by the alternating current or bidirectional power.

FIG. 7 is a circuit block diagram of the present invention showing the inductor (301) in series with the electric-driven luminous body (103) and parallel connected directly with the electric-driven luminous body (101) or with the electric-driven luminous body (101) in series with the resistor (401), so as to be driven by the alternating current or bidirectional power. As shown in FIG. 7, the inductor (301) series connects with the electric-driven luminous body (103), and connects in parallel directly with the electric-driven luminous body (101) or with the electric-driven luminous body (101) in series with the resistor (401), so as to be driven by the alternating current or bidirectional power.

Figure 8:
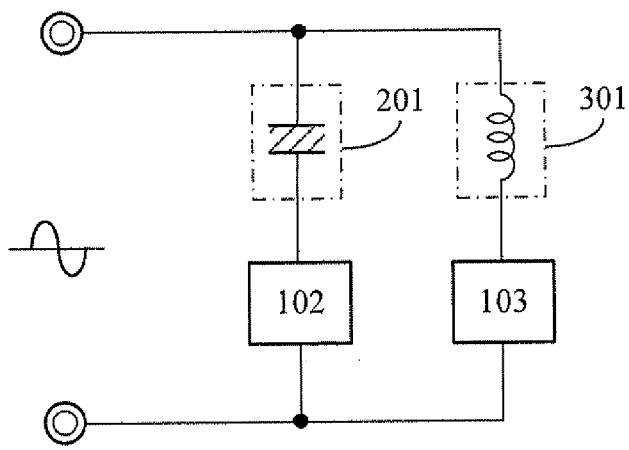
FIG. 8 is a circuit block diagram of the present invention showing the capacitor (201) in series with the electric-driven luminous body (102), which is parallel connected with the electric-driven luminous body (103) in series with the inductor (301), so as to be driven by the alternating current or bidirectional power.

FIG. 8 is a circuit block diagram of the present invention showing the capacitor (201) in series with the electric-driven luminous body (102) and parallel connected with the electric-driven luminous body (103) in series with the inductor (301), so as to be driven by the alternating current or bidirectional power. As shown in FIG. 8, the capacitor (201) series connects with the electric-driven luminous body (102), and connects in parallel with the electric-driven luminous body (103) in series with the inductor (301), so as to be driven by the alternating current or bidirectional power.

The lighting device with pulsation suppression by polyphase-driven electric energy can also be arranged to use three-phase alternating current power to supply electricity to the electric-driven luminous body, so as to minimize the pulsation of the brightness.

Figure 9:
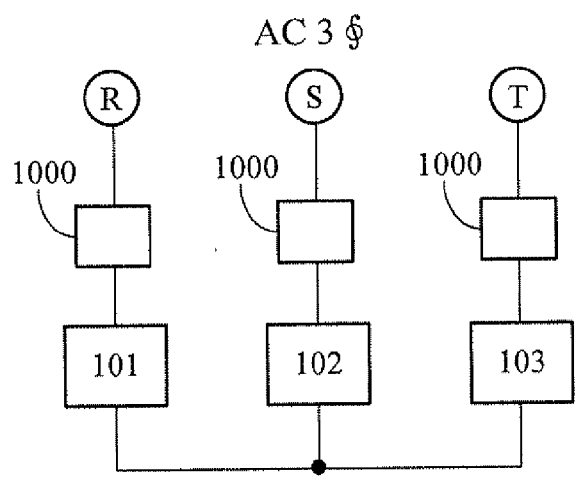
FIG. 9 is a circuit diagram of the present invention wherein the three phase four wire alternating current power is used to drive three sets of electric-driven luminous bodies in Y connection.

FIG. 9 is a circuit diagram of the present invention wherein three phase, four wire alternating current power is used to drive three sets of electric-driven luminous bodies in Y connection. As shown in FIG. 9, this embodiment includes:

One terminal of the electric-driven luminous body (101) is directly connects to three-phase power line R, or the electric-driven luminous body (101) is firstly connected in series with a resistive and/or capacitive and/or inductive impedance component (1000) and then connected to the three-phase power line R, while the other terminal leads to a common joint point of the Y connection.

One terminal of the electric-driven luminous body (102) is directly connected to the three-phase power line S, or the electric-driven luminous body (102) is firstly connected in series with the resistive and/or capacitive and/or inductive impedance component (1000) and then connected to the three-phase power line S, while the other terminal leads to a common joint point of the Y connection.

One terminal of the electric-driven luminous body (103) is directly connected to the three-phase power line T, or the electric-driven luminous body (103) is firstly connected in series with the resistive and/or capacitive and/or inductive impedance component (1000) and then connected to the three-phase power line T, while the other terminal leads to a common joint point of the Y connection.

Figure 10:
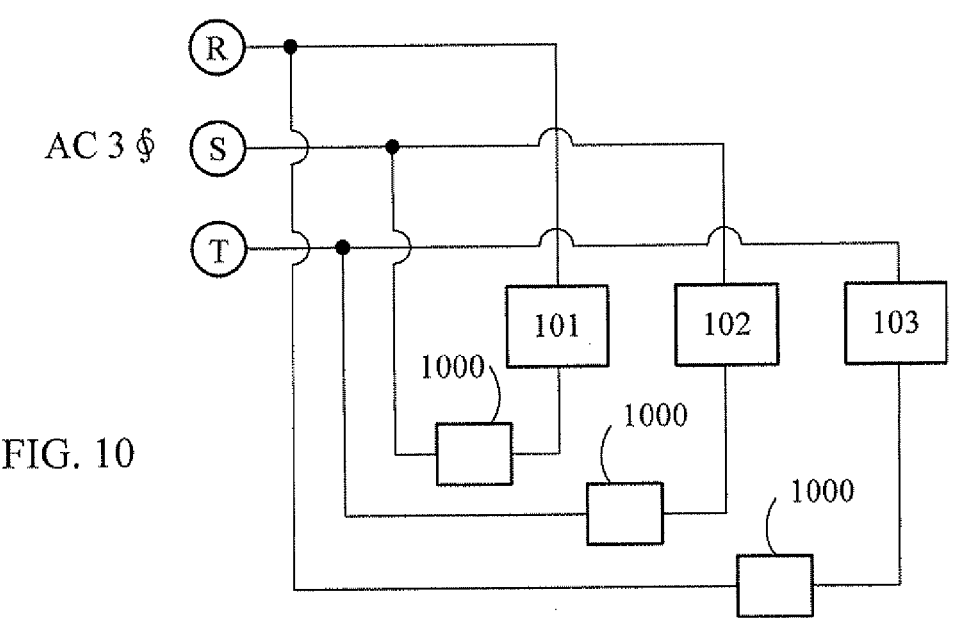
FIG. 10 is a circuit diagram of the present invention wherein the three phase alternating current power is used to drive three sets of electric-driven luminous bodies in Δ connection.

FIG. 10 is the circuit diagram of the present invention wherein the three phase alternating current power is used to drive three sets of electric-driven luminous bodies in Δ connection; as shown in FIG. 10:

The electric-driven luminous body (101) is directly parallel connected between the power line R and the power line S, or is firstly series connected with the resistive and/or capacitive and/or inductive impedance component (1000) and then parallel connected between the power line R and the power line S.

The electric-driven luminous body (102) is directly parallel connected between the power line R and the power line S, or is firstly series connected with the resistive and/or capacitive and/or inductive impedance component (1000) and then parallel connected between the power line S and the power line T.

The electric-driven luminous body (103) is directly parallel connected between the power line R and the power line S, or is firstly series connected with the resistive and/or capacitive and/or inductive impedance component (1000) and then parallel connected between the power line T and the power line R.

Figure 11:
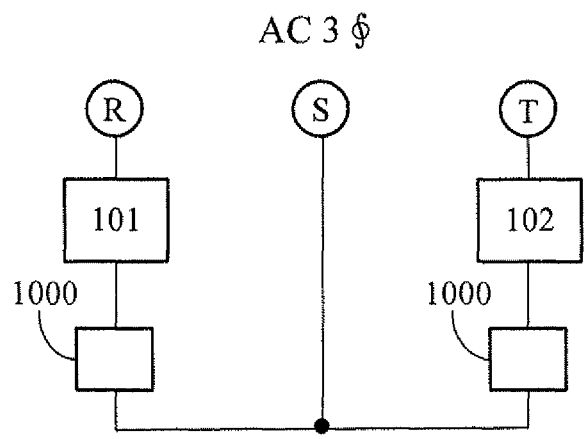
FIG. 11 is a first circuit diagram of the present invention wherein the three phase alternating current power is used to drive two sets of electric-driven luminous bodies in V connection.

FIG. 11 is a first circuit diagram of the present invention wherein the three phase alternating current power is used to drive two sets of electric-driven luminous bodies in V connection; as shown in FIG. 11:

The electric-driven luminous body (101) is directly parallel connected between the power line R and the power line S, or is firstly series connected with the resistive and/or capacitive and/or inductive impedance component (1000) and then parallel connected between the power line R and the power line S.

The electric-driven luminous body (102) is directly parallel connected between the power line R and the power line S, or is firstly series connected with the resistive and/or capacitive and/or inductive impedance component (1000) and then parallel connected between the power line S and the power line T.

Figure 12:
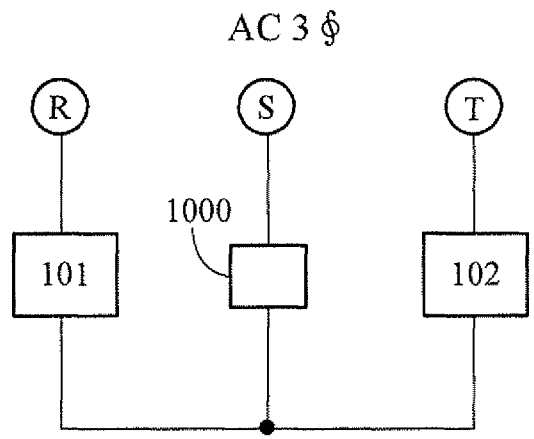
FIG. 12 is a second circuit diagram of the present invention wherein the three phase alternating current power is used to drive two sets of electric-driven luminous bodies in V connection.

FIG. 12 is a second circuit diagram of the present invention wherein the three phase alternating current power is used to drive two sets of electric-driven luminous bodies in V connection:

The electric-driven luminous body (101) is series connected with the electric-driven luminous body (102), and then parallel connected between the power line R and the power line T.

The power line S, after connecting in series with a resistive and/or capacitive and/or inductive impedance component (1000), is then connected to the series connection point of the electric-driven luminous body (101) and the electric-driven luminous body (102).

Figure 13:
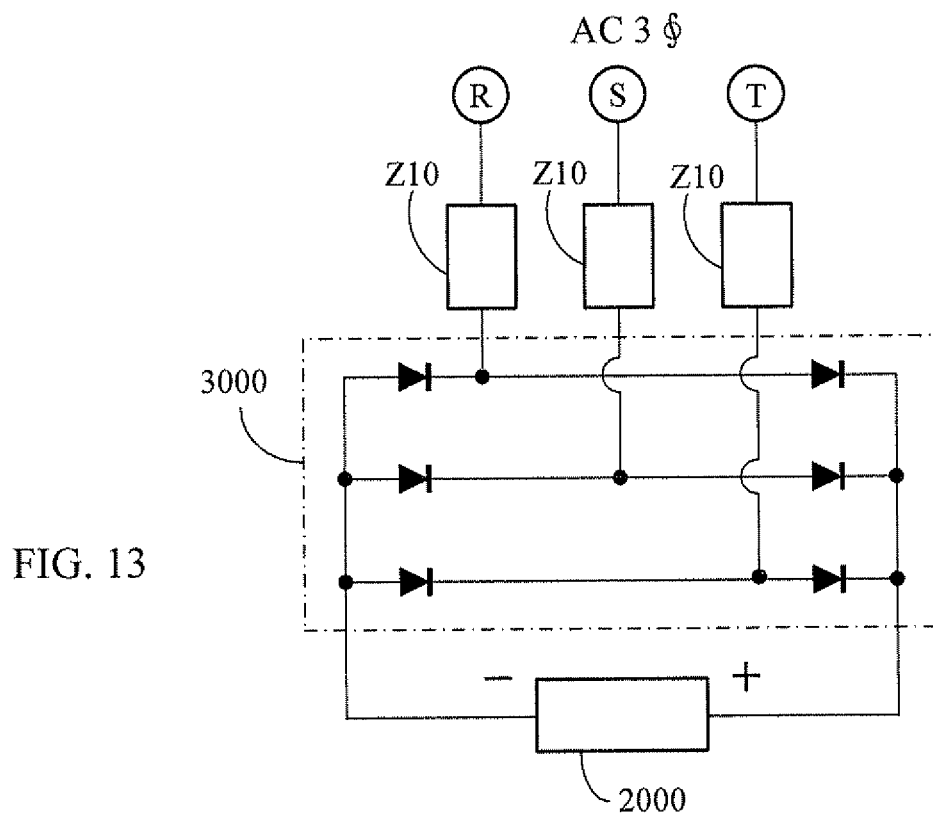
FIG. 13 is a circuit diagram showing three phase alternating current power being supplied through current limiting components (Z10) to a bridge rectifier that provides three phase full wave direct current electric energy to a direct current electric-driven luminous body (2000).

The lighting device with optical pulsation suppression by polyphase-driven electric energy may further rely on direct current power rectified from polyphase alternating current power to drive a common electric-driven luminous body, or to separately drive adjacently installed individual electric-driven luminous bodies, so as to reduce the pulsation of the outwardly projected light, as follows:

FIG. 13 is a circuit diagram showing the three phase alternating current power being supplied, through the current limit component (Z10), to a bridge rectifier that supplies three phase full wave direct current electric energy to the direct current electric-driven luminous body (2000).

As shown in FIG. 13:

The input terminals of three-phase alternating current power—R, S, and T of the three-phase bridge rectifier (3000)—are respectively connected in series with the current limit component (Z10) and then connected to the three-phase alternating current power. The current limiting component (Z10) may include a resistor (401) and/or inductor (301) and/or capacitor (201). The direct current electric energy output from the direct current output terminal is supplied to the direct current electric-driven luminous body (2000).

Direct current electric-driven luminous body (2000) may be a gas bulb with filament or a solid state electric-driven luminous body such as an LED or other electric-driven luminous body.

Figure 14:
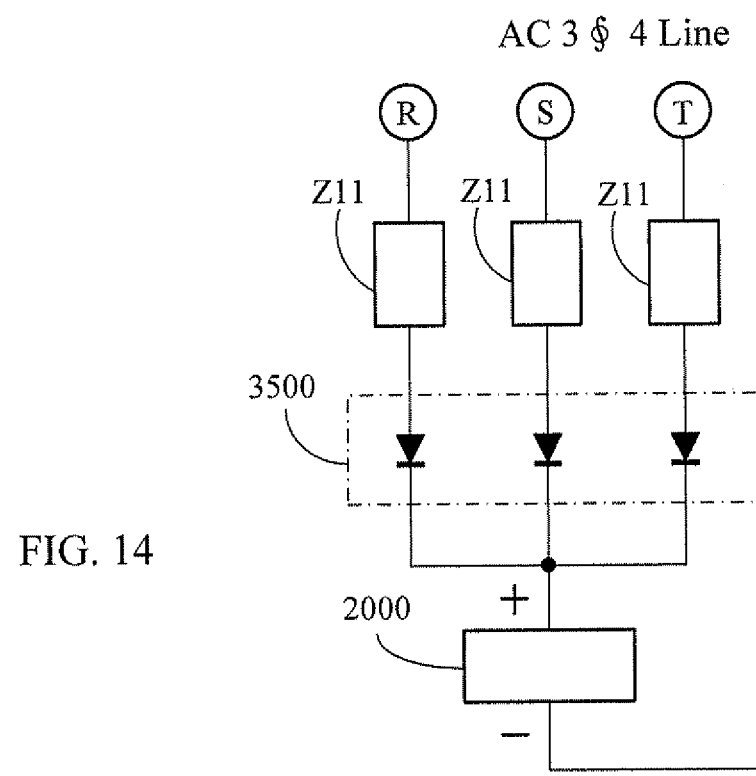
FIG. 14 is the circuit diagram showing three phase alternating current power being supplied through half-wave current limiting impedance components (Z11) to a three phase half-wave rectifier (3500) that supplies rectified direct current electric energy to the direct current electric-driven luminous body (2000).

FIG. 14 is a circuit diagram showing the three phase alternating current power being supplied, through the half-wave current limit impedance component (Z11), to the three phase half-wave rectifier (3500), and the rectified direct current electric energy being supplied to the direct current electric-driven luminous body (2000).

As shown in FIG. 14:

The input terminals of three-phase alternating current power—R, S, and T of the three-phase half wave rectifier (3500)—are respectively connected in series with the half wave current limiting impedance component (Z11) and then connected to the three-phase alternating current power. The half wave current limit impedance component (Z11) may include a resistor (401) and/or inductor (301) and/or capacitor (201). The direct current electric energy output from the direct current output terminal of the three-phase half wave rectifier (3500) is supplied to the direct current electric-driven luminous body (2000) while the negative terminal of the direct current electric-driven luminous body (2000) connects to the neutral line (N) of the three-phase four wire power.

Direct current electric-driven luminous body (2000) may include a gas bulb with filament or a solid state electric-driven luminous body such as an LED or other electric-driven luminous body.

If single phase alternating current power is used, the electric energy may be supplied from at least two of the following sources: 1) output electric energy from a series connection between the single alternating current power source and the resistor (401), 2) output electric energy from a series connection of the single phase alternating current power source with the capacitor (201), and 3) electric energy from a series connection between tithe single phase alternating current power source and the inductor (301), the single phase alternating current being rectified by respective rectifiers, and then jointly used to drive the direct current electric-driven luminous body (2000), so as to reduce pulsation of the output light energy intensity.

Figure 15:
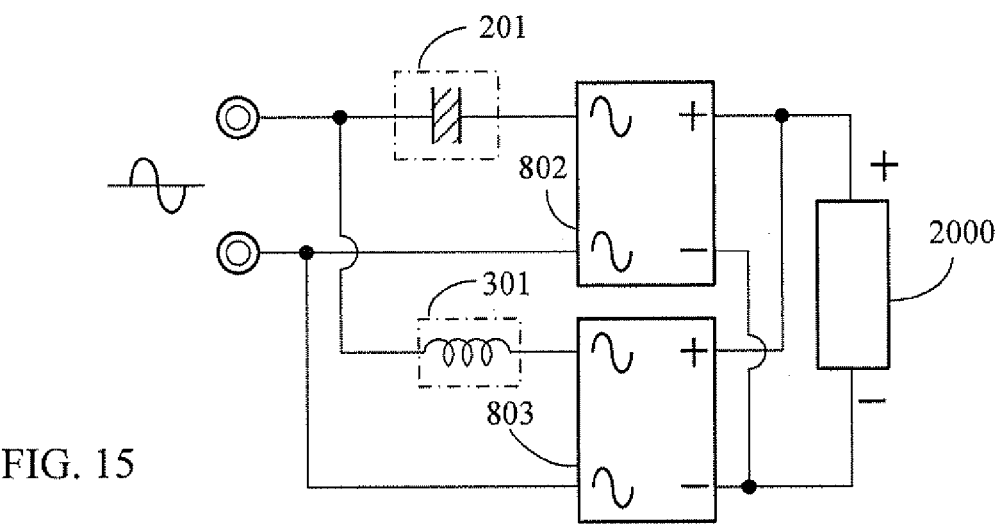
FIG. 15 is a circuit diagram showing single phase power that is split by a capacitor and inductor and then full wave rectified so as to drive the direct current electric-driven luminous body (2000).

FIG. 15 is a circuit diagram showing single phase power being split by a capacitor and the inductor and then being full wave rectified, so as to drive the direct current electric-driven luminous body (2000).

As shown in FIG. 15, one terminal of the single phase alternating current power is connected to one of the alternating current input terminals of the single phase bridge rectifier (802) through the capacitor (201), and the same terminal of the same single phase alternating current power is connected to one of the alternating current input terminals of another single phase bridge rectifier (803) through the inductor (301), while the other terminal of the single phase alternating current power supplies the other alternating current power input terminal of the single phase bridge rectifiers (802) and (803), and then the direct current output terminals of the single phase bridge rectifiers (802) and (803) are connected in parallel with a same polarity, so as to drive the direct current electric-driven luminous body (2000).

Figure 16:
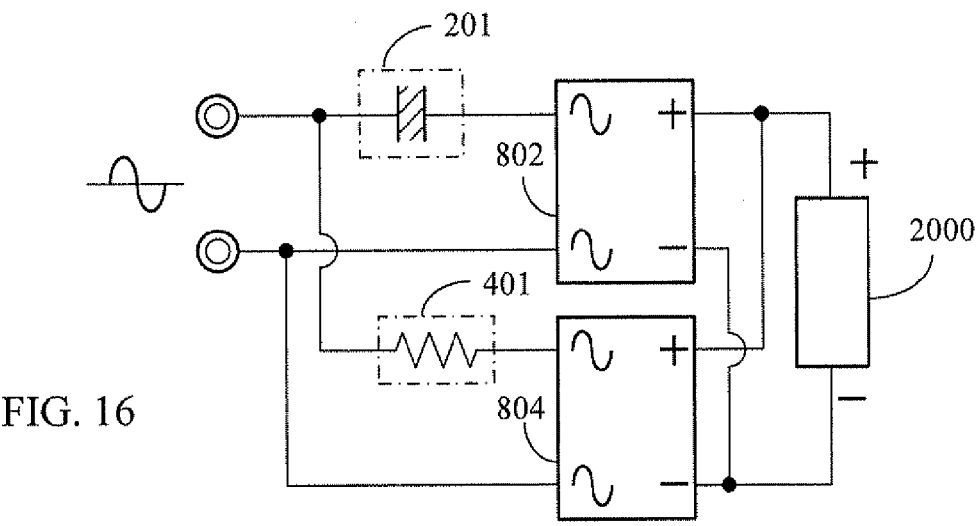
FIG. 16 is the circuit diagram showing single phase power that is split by a capacitor and resistor and then full wave rectified so as to drive the direct current electric-driven luminous body (2000).

FIG. 16 is a circuit diagram showing a single phase power being split by a capacitor and the resistor and then being full wave rectified, so as to drive the direct current electric-driven luminous body (2000).

As shown in FIG. 16, one terminal of the single phase alternating current power is connected to one of the alternating current input terminals of the single phase bridge rectifier (802) through the capacitor (201) and the same terminal of the same single phase alternating current power is connected to one of the alternating current input terminals of another single phase bridge rectifier (804) through the resistor (401), while the other terminal of the single phase alternating current power supplies the other alternating current power input terminal of the single phase bridge rectifiers (802) and (804), and then the direct current output terminals of the single phase bridge rectifiers (802) and (804) are connected in parallel with a same polarity, so as to drive the direct current electric-driven luminous body (2000).

Figure 17:
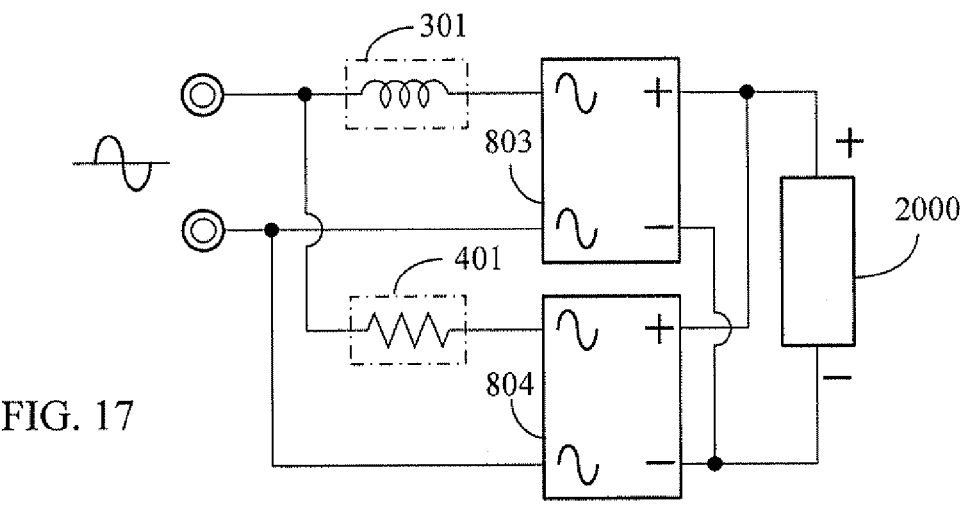
FIG. 17 is a circuit diagram showing single phase power that is split by an inductor and resistor and then full wave rectified so as to drive the direct current electric-driven luminous body (2000).

FIG. 17 is the circuit diagram showing that a single phase power being split by the inductor and the resistor and then being full wave rectified, so as to drive the direct current electric-driven luminous body (2000).

As shown in FIG. 17, one terminal of the single phase alternating current power is connected to one of the alternating current input terminals of the single phase bridge rectifier (803) through the inductor (301), and the same terminal of the same single phase alternating current power is connected to one of the alternating current input terminals of another single phase bridge rectifier (804) through the resistor (401), while the other terminal of the single phase alternating current power supplies the other alternating current power input terminal of the single phase bridge rectifiers (803) and (804), and then the direct current output terminals of the single phase bridge rectifiers (803) and (804) are connected in parallel with a same polarity, so as to drive the direct current electric-driven luminous body (2000).

Figure 18:
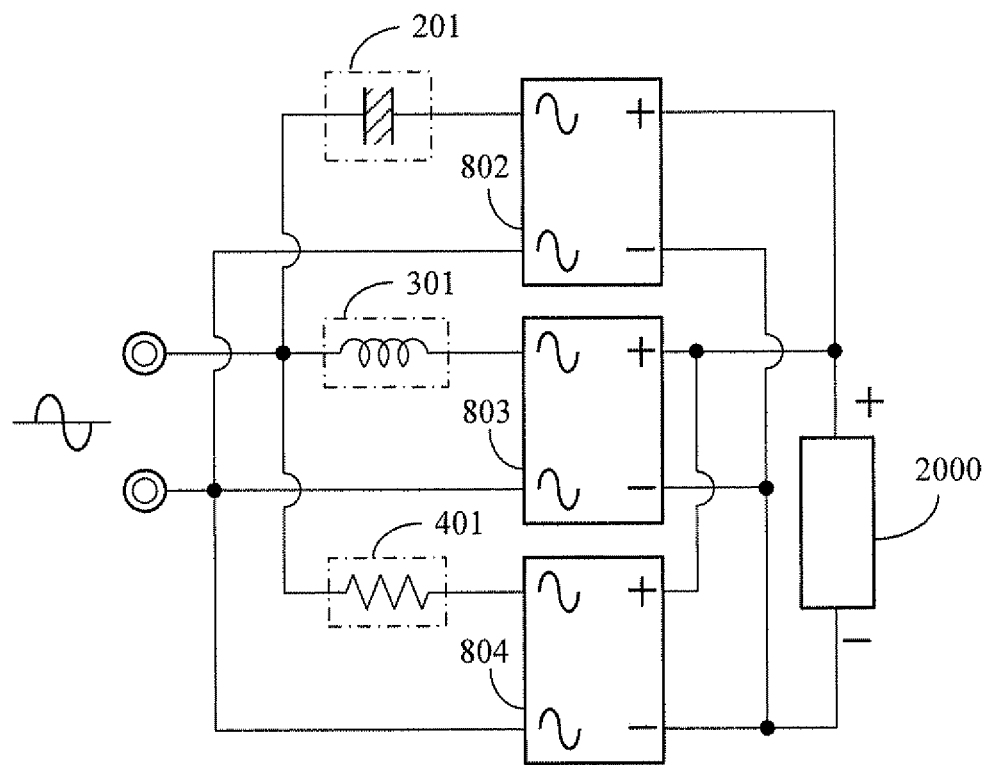
FIG. 18 is a circuit diagram showing single phase power that is split by an inductor, resistor, and capacitor and then full wave rectified so as to drive the direct current electric-driven luminous body (2000).

FIG. 18 is a circuit diagram showing single phase power being split by an inductor, resistor, and capacitor and then being full wave rectified, so as to drive the direct current electric-driven luminous body (2000).

As shown in FIG. 18, one terminal of the single phase alternating current power is connected to one of the alternating current input terminals of the single phase bridge rectifier (803) through the inductor (301), and the same terminal of the same single phase alternating current power is connected to one of the alternating current input terminals of another single phase bridge rectifier (804) through the resistor (401), and the same terminal of the same single phase alternating current power is connected to one of the alternating input terminals of another single phase bridge rectifier (802) through the capacitor (201), while the other terminal of the single phase alternating current power supplies the other alternating current power input terminal of the single phase bridge rectifiers (802), (803) and (804), and then the direct current output terminals of the single phase bridge rectifiers (802), (803) and (804) are connected in parallel with a same polarity, so as to drive the direct current electric-driven luminous body (2000).

Figure 19:
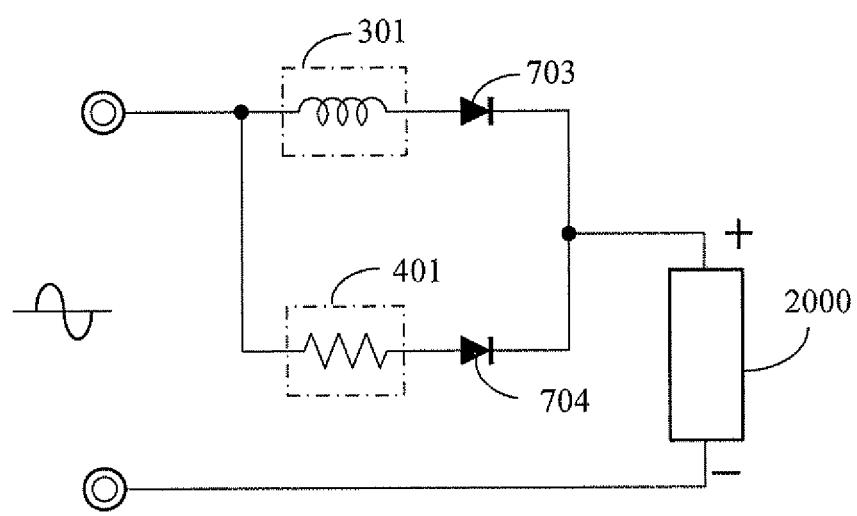
FIG. 19 is a circuit diagram showing single phase power that is split by an inductor and resistor and then half-wave rectified so as to drive the direct current electric-driven luminous body (2000).

FIG. 19 is a circuit diagram showing single phase power being split by and inductor and the resistor and then being half-wave rectified, so as to drive the direct current electric-driven luminous body (2000).

As shown in FIG. 19, one terminal of the single phase alternating current power is connected to the alternating current input terminal of the rectifier diode (703) through the inductor (301), and the same terminal of the same single phase alternating current power is connected to the alternating current input terminal of another rectifier diode (704)

through the resistor (401), while the other terminal of the single phase alternating current power is connected to the negative terminal of the direct current electric-driven luminous body (2000), and then the direct current output positive terminals of the rectifier diodes (703) and (704) are connected in parallel with a same polarity, so as to drive the direct current electric-driven luminous body (2000).

Figure 20:
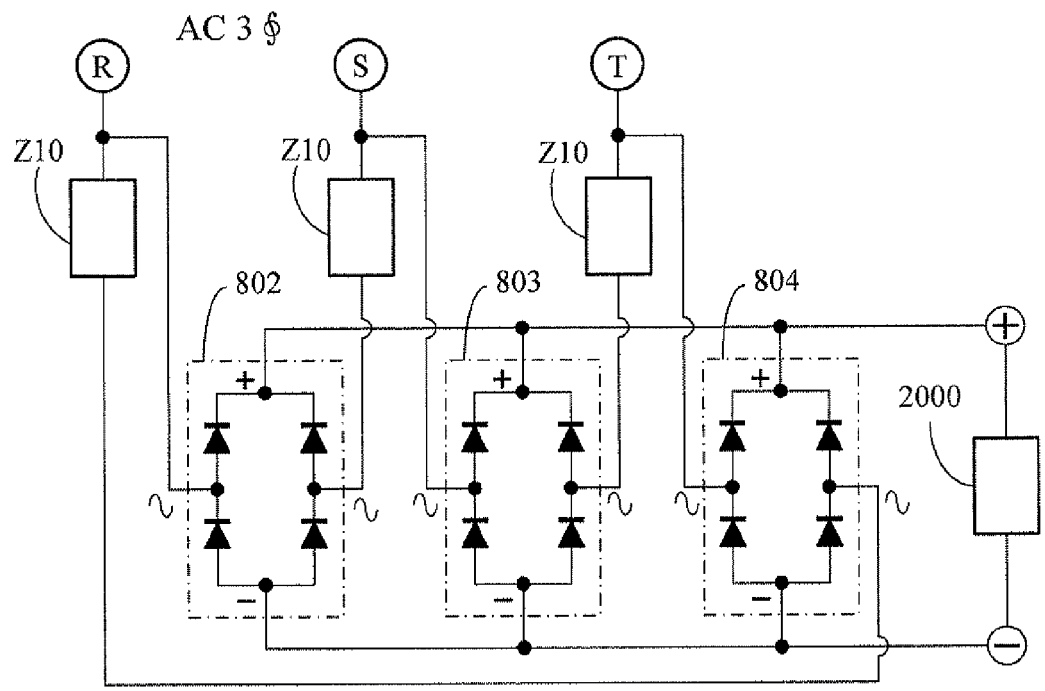
FIG. 20 is a circuit diagram in which each phase of the three-phase alternating current power is individually connected in parallel with a circuit device that is series connected to a current limiting component (Z10) and to the alternating current terminal of a single-phase bridge rectifier, the direct current output terminal of the single-phase bridge rectifier of each phase being connected in parallel with the same polarity for jointly driving the direct current electric-driven luminous body (2000).

FIG. 20 is the circuit diagram in which each phase of the three-phase alternating current power being individually connected in parallel with a circuit device in series connected by the current limit component (Z10) and the alternative current terminal of single-phase bridge rectifier, then the direct current output terminal of the single-phase bridge rectifier of each phase being homo-polar connected in parallel for jointly driving the direct current electric-driven luminous body (2000); as shown in FIG. 20, it mainly consists of:

Direct current electric-driven luminous body (2000) may be constituted by a solid state luminous body driven by two or more than two direct current power sources, including foundational light emitting units configured by light emitting diodes or organic light emitting diodes and driven by the direct current power, or other solid state luminous bodies capable of being driven by the direct current power.

The current limiting component (Z10) is connected in series with the alternating current terminal of the single phase bridge rectifier (804), then connected in parallel between the three-phase alternating current power line R and the three-phase alternating current power line T.

The current limiting component (Z10) is connected in series with the alternating current terminal of the single phase bridge rectifier (802), then connected in parallel between the three-phase alternating current power line S and the three-phase alternating current power line R.

The current limiting component (Z10) is connected in series with the alternating terminal of the single phase bridge rectifier (803), then connected in parallel between the three-phase alternating current power line T and the three-phase alternating current power line S.

Current limiting component (Z10) may be constituted by one or more than one of the following circuit structures, including:

1) At least one or more than one of the resistive impedance component, inductive impedance component and capacitor impedance component being connected in series, in parallel, or in series and parallel; and 2) a fixed-current control circuit configured by a solid state semi-conductive circuit for controlling the light emitting unit in an analog or chopping manner.

Figure 21:
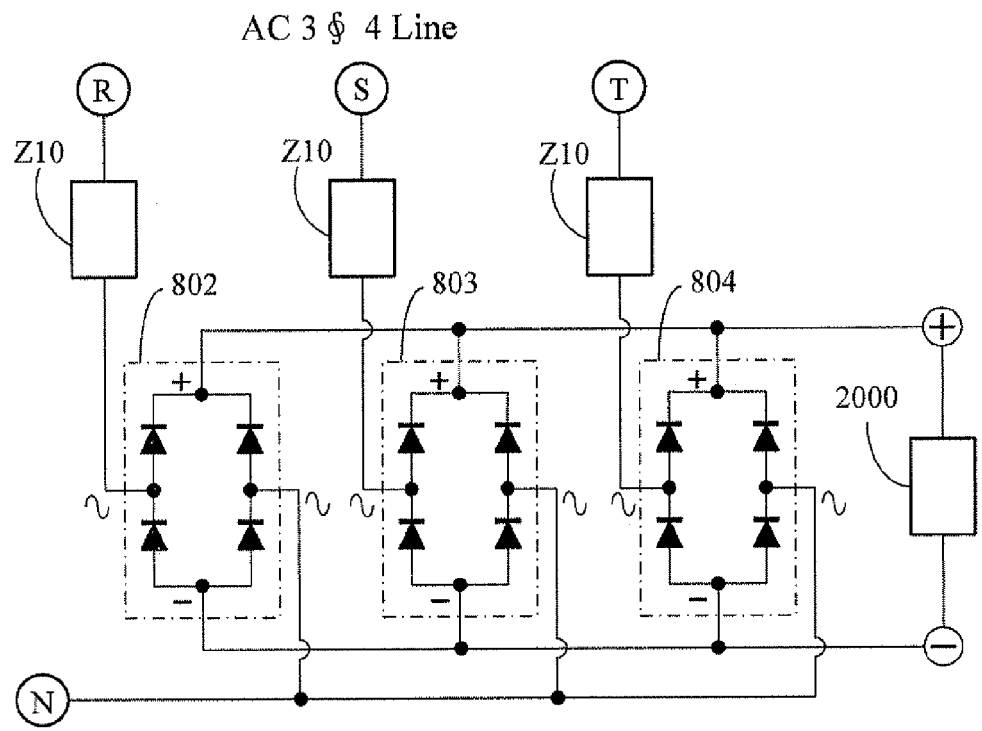
FIG. 21 is a circuit diagram in which a circuit device connected in series to the current limiting component (Z10) and the alternating current terminal of a single-phase bridge rectifier is individually installed between the R, S, and T lines of the three phase, four wire alternating current power and the neutral line (N) of the three phase four wire alternating current power, the direct current output terminal of the single-phase bridge rectifier of each phase being connected in parallel with the same polarity for jointly driving the direct current electric-driven luminous body (2000).

FIG. 21 is a circuit diagram in which a circuit device that is series connected to the current limiting component (Z10) and the alternating current terminal of single-phase bridge rectifier is further individually installed between the R, S, and T lines of the three phase, four wire alternating current power and the neutral line (N) of the three phase, four wire alternating current power, and then the direct current output terminal of the single-phase bridge rectifier of each phase connected in parallel with a same polarity for jointly driving the direct current electric-driven luminous body (2000), as follows:

Direct current electric driven luminous body (2000) may be constituted by a solid state luminous body driven by two or more than two direct current power sources, including foundational light emitting units configured by light emitting diodes or organic light emitting diodes and driven by the direct current power, or other solid state luminous bodies capable of being driven by the direct current power.

The current limiting component (Z10) is connected in series with the alternative current terminal of the single phase bridge rectifier (802), then connected in parallel between the three-phase four-wire alternating current power line R and the neutral line N of the three-phase four-wire alternating current power.

The current limiting component (Z10) is connected in series with the alternating current terminal of the single phase bridge rectifier (803), then connected in parallel between the three-phase four-wire alternating current power line S and the neutral line N of the three-phase four-wire alternating current power.

The current limiting component (Z10) is connected in series with the alternating current terminal of the single phase bridge rectifier (804), then connected in parallel between the three-phase four-wire alternating current power line T and the neutral line N of the three-phase four-wire alternating current power.

Current limiting component (Z10) may be constituted by one or more than one of the following circuit structures, including:

1) at least one or more than one resistive impedance component, inductive impedance component and capacitor impedance component being connected in series, in parallel, or in series and parallel; and 2) a fixed-current control circuit configured by a solid state semi-conductive circuit for controlling the light emitting unit in an analog or chopping manner.

The invention claimed is:

1. A lighting device with optical pulsation suppression by polyphase-driven electric energy, the lighting device being supplied with electric power from a three-phase alternating current power line including a first wire (R), a second wire (S), a third wire (T), comprising:
   a first full-wave bridge rectifier (802), wherein a first alternating current input end of the first full-wave bridge rectifier (802) is connected to the first wire (R), and a second alternating current input end of the full-wave bridge rectifier (802) is connected to the second wire (S) through a first series-connected current limiting component (Z10);
   a second full-wave bridge rectifier (803), wherein a first alternating current input end of the second full-wave bridge rectifier (803) is connected to the second wire (S), and a second alternating current input end of the second full-wave bridge rectifier (803) is connected to the third wire (T) through a second series-connected current limiting component (Z10);
   a third full-wave bridge rectifier (804), wherein a first alternating current input end of the third full-wave bridge rectifier (804) is connected to the third wire (T), and a second alternating current input end of the full-wave bridge rectifier (804) is connected to the first wire (R) through a third series-connected current limiting component (Z10),
   wherein the first, second, and third full-wave bridge rectifiers (802, 803, 804) have direct current positive output ends connected in parallel and direct current negative output ends connected in parallel to drive a direct current driven luminous body (2000).

2. A lighting device with optical pulsation suppression by polyphase-driven electric energy as claimed in claim 1, wherein the first, second, and third impedance devices each includes at least one of the following impedance devices:
   (a) a resistive impedance device;
   (b) a capacitive impedance device;
   (c) an inductive impedance device; and (d) a constant or limited current control circuit for controlling a solid state light emitting unit in an analog or chopping manner.

3. A lighting device with optical pulsation suppression by polyphase-driven electric energy as claimed in claim 1, wherein the direct current driven luminous body (2000) includes at least one solid state luminous device.

4. A lighting device with optical pulsation suppression by polyphase-driven electric energy as claimed in claim 3, wherein the at least one solid state luminous device includes at least one LED or organic LED.

5. A lighting device with optical pulsation suppression by polyphase-driven electric energy, the lighting device being supplied with electric power from a three-phase four-wire alternating current power line including a first wire (R), a second wire (S), a third wire (T), and a neutral wire (N), comprising:
- a first full-wave bridge rectifier (802) and a first current limiting component (Z10) having one end connected with the first alternating current input end of the first full-wave bridge rectifier (802), a second end of the first current limiting component (Z10) being connected to the first wire (R), and a second alternating current end of the first full-wave bridge rectifier (802) being connected to the neutral wire (N);
- a second full-wave bridge rectifier (803) and a second current limiting component (Z10) having one end connected with the first alternating current input end of the second full-wave bridge rectifier (803), a second end of the second current limiting component (Z10) being connected to the second wire (S), and a second alternating current end of the second full-wave bridge rectifier (803) being connected to the neutral wire (N);
- a third full-wave bridge rectifier (804) and a third current limiting component (Z10) having one end connected with the first alternating current input end of the third full-wave bridge rectifier (804), a second end of the third current limiting component (Z10) being connected to the third wire (T), and a second alternating current end of the third full-wave bridge rectifier (804) being connected to the neutral wire (N),
- wherein the first, second, and third full-wave bridge rectifiers (802, 803, 804) have direct current positive output ends connected in parallel and direct current negative output ends connected in parallel to drive a direct current driven luminous body (2000).

6. A lighting device with optical pulsation suppression by polyphase-driven electric energy as claimed in claim 5, wherein the first, second, and third impedance devices each includes at least one of the following impedance devices:
   (a) a resistive impedance device;
   (b) a capacitive impedance device;
   (c) an inductive impedance device; and
   (d) a constant or limited current control circuit for controlling a solid state light emitting unit in an analog or chopping manner.

7. A lighting device with optical pulsation suppression by polyphase-driven electric energy as claimed in claim 5, wherein the direct current driven luminous body (2000) includes at least one solid state luminous device.

8. A lighting device with optical pulsation suppression by polyphase-driven electric energy as claimed in claim 7, wherein the at least one solid state luminous device includes at least one LED or organic LED.

\* \* \* \* \*